United States Patent Office 3,450,652
Patented June 17, 1969

3,450,652
WATER SOLUBLE AMINOPLAST/AQUEOUSLY DISPERSED PLASTICIZED NITROCELLULOSE LATEX COMPOSITIONS
Kuang Farn Lin, Wilmington, Del., assignor to Hercules Incorporated, Wilmington, Del., a corporation of Delaware
No Drawing. Filed June 6, 1966, Ser. No. 555,270
Int. Cl. C08b 21/14; C09d 5/02, 3/16
U.S. Cl. 260—15                              13 Claims

ABSTRACT OF THE DISCLOSURE

Nitrocellulose latices are disclosed comprising discrete particles of plasticized nitrocellulose suspended in an aqueous medium having dissolved therein a heat settable amino resin.

---

This invention relates to improved aqueous nitrocellulose coating compositions.

Coating compositions comprising aqueous dispersions, referred to as latices or hydrosols, of nitrocellulose are known. These can be prepared by a variety of methods, each of which results in formation of a smooth, free-flowing dispersion of small nitrocellulose-containing particles in water. For example, a nitrocellulose lacquer can be emulsified in water and the solvent stripped therefrom, leaving the nitrocellulose particles suspended in the water. It is also known to prepare nitrocellulose dispersions by comminution of fibrous nitrocellulose in a ball mill or the like in the presence of water.

Aqueous nitrocellulose dispersions have been found quite useful in many coating applications. In particular, they are useful for applying protective, decorative and functional coatings to metals, wood, paper, glass, leather, etc., for heat seal coatings, as binders for inks, and as adhesives.

In accordance with this invention, nitrocellulose latex coating compositions have been found which form films exhibiting improved hardness, mar resistance, stain resistance, and flame resistance, as well as decreased solubility compared to that of known nitrocellulose coating compositions. These compositions comprise a nitrocellulose latex coating composition having a water-reducible amino resin dissolved in the aqueous phase. More specifically, this invention relates to a latex of nitrocellulose particles dispersed in an aqueous medium, said aqueous medium comprising water having dissolved therein 5 to 100%, preferably 10 to 50%, by weight, based upon the total solids content of the latex of an amino resin.

The dispersed phase of the compositions of this invention contains also a nitrocellulose plasticizer which decreases the softening and coalescing temperature of the nitrocellulose particles to a point where they can be formed into a film readily. The plasticizer also serves to increase the flexibility of the film. Normally, the plasticizer is of the nitrocellulose solvent type, which, because of their chemical affinity for nitrocellulose, are capable of forming a solution or gel with nitrocellulose if used in sufficient quantity or when heated. The ratio of nitrocellulose to plasticizer is preferably between about 40/60 and 90/10, preferably 60/40 to 70/30. Within these ranges, it is found that film formation can take place under the most practical conditions and the resultant film has the best properties.

The nitrocellulose plasticizer, or at least a portion thereof, is customarily incorporated into the nitrocellulose particles during the preparation of the latex. Thus, when the latex is prepared by stripping the solvent from a lacquer emulsion, the plasticizer will have been previously incorporated into the lacquer and will form a part of the nitrocellulose particle suspended in the water. When the latex is prepared by ball milling of fibrous nitrocellulose particles, the nitrocellulose plasticizer is added to the resultant dispersion and just enough heat is applied to drive a portion of the same into the particles. In this case, it is also possible to have a portion of the plasticizer present as a separate dispersion or solution in the suspending water.

In one attractive embodiment of the invention, the nitrocellulose dispersed phase is composed of a mixture of nitrocellulose particles having two or more degrees of plasticization. That is to say, a portion of the particles are overplasticized or soft particles, while another portion are underplasticized, hard particles. Upon removal of the dispersing water, these hard and soft particles come into intimate contact and coalesce with plasticizer migrating from the soft particles to the hard particles seeking an equilibrium state whereby a hard, non-tacky film is formed. Typically, the hard particles have a ratio of nitrocellulose to plasticizer of about 90/10 to 70/30 while the soft particles have a ratio of about 10/90 to 50/50. Separate latices containing the desired particles are prepared and blended to yield a blended latex having an overall nitrocellulose to plasticizer ratio of about 80/20 to 40/60.

Representative nitrocellulose plasticizers which can be used in the compositions include tributoxyethyl phosphate, triethylene glycol di-(2-ethyl butyrate), triethyl citrate, acetyl triethyl citrate, diisobutyl adipate, dibutyl itaconate, dibutyl sebacate, diethyl tartrate, tetraethylene glycol di-(2-ethyl caproate), dibutyl tartrate, di(benzoyl triethylene glycol) phthalate, dibutyl phthalate, di-(2-ethylhexyl) adipate, dioctyl adipate, dioctyl azelate, di-(2-ethylhexyl) azelate, dioctyl sebacate, dioctyl phthalate, lower alkyl phosphates, aryl phosphates, butylphthalylbutyl glycolate, chlorinated biphenyls, butyl benzyl phthalate, acetyl tributyl citrate, and chloroalkyl phosphates.

The nitrocellulose phase usually also contains a modifying resin of the type commonly employed in nitrocellulose lacquers for the purpose of improving the degree of film build-up and providing better depth and gloss in the final coating. Any of the natural and synthetic resins normally employed in nitrocellulose lacquers for this purpose can be used. Examples of modifying resins which can be used include maleic modified rosin esters, ester gums, dammar gum, shellac, alkyd resins, chlorinated triphenyls, acrylic resins, vinyl resins, and any other natural or synthetic resins compatible with nitrocellulose.

To assure the maintenance of the nitrocellulose particles and other solids in the dispersed state, an emulsifying agent or protective colloid can be included in the aqueous phase. Any agent normally useful in this capacity with nitrocellulose lacquers can be used. Typical of such materials are alkylphenyl ethers of ethylene oxide condensates, alkylphenyl sulfonates, sodium or potassium oleates, and water-soluble cellulosic derivatives such as methyl cellulose, inter alia.

It is also sometimes desirable to add pigments or other fillers to these latices. In particular, when the latex is to be used for furniture or wood paneling or the like, the resulting finish is usually so glossy that it is desirable to add a flatting agent to reduce the gloss. Any flatting agent normally employed in nitrocellulose lacquers can be employed for this purpose.

Water-reducible amino resins usable in this invention are the reaction products of the partial condensation of a poly-fuctional amino compound with another compound such as an aldehyde. Reactivity of these compounds with each other is such that the condensation can be started or stopped almost at will by adjusting the pH and temperature at which the condensation is effected. Thus it is possible to prepare a compound having the desired water solubility easily with almost any combination of reactants from the class mentioned above. The resins are prepared by combining the reactants in the desired molar ratio in an aqueous alkaline or acid medium, heating for the pre-determined time required to effect the desired degree of polymerization, and discontinuing reaction at that point by cooling, neutralizing the reaction medium and recovering the resin. When this resin is later subjected to the influence of heat in an acid medium, it resumes polymerization to form a hard, insoluble, highly cross-linked, thermoset structure. Such resins are well known in the art.

Examples of amino resins which can be used in the nitrocellulose latices according to this invention include urea-formaldehyde, melamine-formaldehyde, copolymers of urea-melamine-formaldehyde, similar resins of urea with other aldehydes such as furfural and acetaldehyde, water-reducible acrylic amino resins, resins derived from methylol derivatives of urea or melamine with polyamines, and alkyl ethers of polymethylol ureas or polymethylol melamines and methylol derivatives of polyacrylamide homopolymers or copolymers. Resins prepared from urea and formaldehyde and those of the alkyl ethers of polymethylol ureas are particularly preferred.

To prepare the coating compositions according to this invention, the amino resin is simply added to the preformed nitrocellulose latex. It can be added either in the form of a solution in water or in solid form. Since the amino resin is water-reducible it readily dissolves and becomes homogeneously dispersed throughout the aqueous medium of the latex upon agitation.

The amino resin can be incorporated into the nitrocellulose latex in amounts of about 5 to 100%, based upon the total solids content of the latex. Greater amounts can be used, but these are not normally preferred since substantial changes in drying conditions are called for in order to effect the degree of cure required to form a hard, non-tacky film. Preferably, the amino resin content is about 10 to 50%.

The efficacy of the amino resin in improving the films formed by the latices is believed to result from the condensation of the amino resin to form a highly cross-linked structure with itself and also with the nitrocellulose and other film-forming ingredients in the latex, such as the modifying resins. This cross-linking is usually promoted by an acid medium. A sufficiently acid environment is usually provided by the acidic nature of the latex solids and certain surfactants. However, additional acid catalysts can be added to adjust the pH value of the aqueous medium if needed or desired.

Conversion of the latex containing the amino resin into a hard, continuous film can sometimes be accomplished in some cases at room temperature, though more frequently it will be desirable to apply heat. Except in special cases, the coalescence of the nitrocellulose particles will proceed only under the influence of heat. The condensation of the amino resin, while it will proceed at room temperature, is aided by the heat. The heat also promotes the condensation and cross-linking of the amino resin.

The optimum condition for film formation is determined primarily by the ratio of nitrocellulose to plasticizer in the latex and by the concentration of amino resin in the composition. Lower film forming temperatures are favored by lower nitrocellulose/plasticizer ratios and by low concentrations of amino resins. In most cases, baking of the film at about 60 to 120° C. for about 3 to 15 minutes is optimum.

The condensation and cross-linking reactions usually begin to take place within a short time after bringing the amino resin into contact with the acidic environment in the latex. These reactions, in most cases, commence, at least slowly, even without the addition of heat or other driving force. Thus, the pot life of these latices is relatively short, and normally the amino resin is added to the latex shortly before application of the composition to a substrate.

In the examples which follow, the invention is exemplified with several illustrative examples. Parts and percentages are by weight unless otherwise indicated.

EXAMPLE 1

A nitrocellulose hard particle latex was prepared by stripping solvent from a lacquer emulsion containing nitrocellulose, tributoxyethyl phosphate, and a rosin-maleic anhydride-pentaerythritol ester alkyd resin in the ratio of 40 to 50 to 10. The resulting latex contained 50% total solids. A soft particle latex was prepared similarly containing nitrocellulose and tributoxyethyl phosphate in the ratio of 40 to 60, also at 50% solids. These were blended at 3 to 1 ratio to prepare a mixed particle latex having the overall composition (nitrocellulose/plasticizer/resin) of about 40/37.5/22.5, still at 50% solids. This resin coalesced upon baking at 80° C. for three minutes to form a film having a Sward hardness of 26 to 28. Upon rubbing with a cloth soaked in methyl ethyl ketone, the film dissolved.

A portion of the above latex was modified by adding thereto 20%, based on the weight of the non-volatiles therein, of an adhesive-type water-reductible urea-formaldehyde resin. The mixture was stirred thoroughly to assure uniform mixing and the solids content was adjusted to about 50%. The resulting composition coalesced to form a clear film upon baking at 80° C. for three minutes. This film had a Sward hardness of 42 to 44 and when rubbed with the methyl ethyl ketone soaked cloth, became tacky on the surface but did not dissolve.

The latex composition containing the urea-formaldehyde resin formed a clear, non-tacky film in about 30 minutes at room temperature without baking. Its room temperature pot life was about 5 hours.

EXAMPLE 2

Example 1 was repeated, substituting the dimethyl ether of dimethylol urea for the urea-formaldehyde resin. The resulting composition had a pot life of about 4 days at room temperature.

When applied to a substrate, this composition formed a clear, hard film in about 30 minutes at room temperature or upon baking for 3 minutes at 80° C. The film, in either case, had a Sward hardness of 42 to 44 and was insoluble in methyl ethyl ketone.

EXAMPLE 3

Water wet fibrous nitrocellulose containing about 12% nitrogen by weight and having a standard ASTM 5/16-inch falling ball viscosity of 5-6 seconds in 12.2% by weight concentration in a solvent composed of 55% toluene, 25% denatured alcohol and 20% ethyl acetate was mixed with water to form a slurry containing 25.3% by weight nitrocellulose. This slurry was comminuted in a ball mill for about 15 hours at 44 r.p.m. After 15 hours, most of the particles were irregularly shaped fragments of 1 micron or less in size. The water was drained and vacuum filtered to produce a dispersion of about 50% nitrocellulose in water. To this was added about 2% by weight methyl cellulose to form a smooth homogeneous fluid dispersion.

A resin emulsion was prepared by mixing 138 parts of a coconut oil fatty acid modified phthalic anhydride-pentaerythritol non-drying alkyd resin with 4.2 parts of alkylaryl poly(ethyleneoxy) ethanol and 2.8 parts of oleic acid and pouring the same with continuous vigorous agitation into 145 parts of an aqueous ammonia solution containing 10 parts ammonium hydroxide to produce a resin emulsion containing about 50% by weight non-volatile content.

A plasticizer emulsion was prepared by mixing 150 parts of dibutylphthalate with 3 parts of a surface active agent comprised of polyoxyethylene esters of mixed tall oil fatty and resin acids. This mixture was poured with vigorous agitation into 72 parts of water containing 0.36 part sodium dioctylsulfosuccinate.

One hundred and sixteen (116) parts of the nitrocellulose hydrosol dispersion was blended with 33.8 parts of the plasticizer emulsion and 46 parts of the resin emulsion and 30.2 additional parts of water to form a nitrocellulose hydrosol or latex. This latex was heated to about 85° C. for 10 minutes to effect incorporation of some of the plasticizer into the nitrocellulose particles.

To 100 parts of the partially plasticized latex was added 14 parts of a 65% solution in water of a urea-formaldehyde resin. The mixture was stirred thoroughly.

Films were formed of the latex before and after addition thereto of the amino resin. Both formed clear, non-tacky films after baking at 100° C. for about 5 minutes. The film without amino resin had Sward hardness of about 25 and was soluble in methyl ethyl ketone. The film containing the amino resin had a Sward hardness of about 42 and was insoluble.

The compositions of this invention can contain other additives and components, as needed, to impart other desirable properties thereto. For example, in many cases, it is desirable to add a water-soluble, low-vapor pressure material to retard the evaporation rate of the water. Glycols are useful in this respect. Ethylene glycol, at a level of about 4% of the water content of the latex, has been found to be quite helpful.

The modified latex compositions of this invention can be applied to a substrate by any method desired, such as e.g. by brushing, spraying, or rolling. They are particularly suited for application by spraying due to their relatively low viscosity.

Because the bulk of the film-forming material in the compositions of this invention is in suspension rather than in solution, it is possible to prepare these compositions having fairly high total solids content while retaining a low viscosity. The total solids content of these compositions can be about 40 to 70%. The total solids determination includes nitrocellulose, plasticizer, hard resin, amino resin, pigments, and any other solid material which remains in the finished film.

What I claim and desire to protect by Letters Patent is:

1. A nitrocellulose latex comprising plasticized nitrocellulose particles dispersed in an aqueous medium, said aqueous medium comprising water having dissolved therein 5 to 100% by weight, based upon the total solids content of the latex, of an amino-aldehyde resin.

2. A nitrocellulose latex composition according to claim 1 where the ratio of nitrocellulose to plasticizer is about 90/10 to 40/60.

3. A nitrocellulose latex composition according to claim 1 wherein the water-soluble amino-aldehyde resin is selected from the class consisting of (1) condensation products of urea and formaldehyde and derivatives thereof, and (2) methylol derivatives of acrylamide polymers.

4. A nitrocellulose latex composition according to claim 1 where the nitrocellulose particles contain, as a plasticizer, tributoxyethyl phosphate.

5. A nitrocellulose latex composition according to claim 1 where the nitrocellulose particles contain, as a plasticizer, dibutyl phthalate.

6. A nitrocellulose latex composition according to claim 1 wherein the nitrocellulose phase contains a nitrocellulose modifying hard resin.

7. A nitrocellulose latex composition according to claim 6 where the modifying resin is an alkyd resin selected from the class consisting of rosin-maleic anhydride-pentaerythritol esters and coconut oil modified non-drying alkyds.

8. A nitrocellulose latex comprising plasticized nitrocellulose particles dispersed in an aqueous medium, said aqueous medium comprising water having dissolved therein 5–100%, by weight, based on the total solids content of the latex, of an amino-aldehyde resin, said nitrocellulose particles being comprised of a major portion of underplasticized particles having a nitrocellulose to plasticizer ratio between about 90/10 and 70/30 and a minor portion of overplasticized particles having a nitrocellulose to plasticizer ratio between about 10/90 and 50/50, the ratio of underplasticized to overplasticized particles being less than about 9/1 and the overall nitrocellulose plasticizer ratio of the latex being between about 90/10 and 40/60.

9. A nitrocellulose latex composition according to claim 8 wherein the water soluble amino resin is selected from the class consisting of (1) condensation products of urea and formaldehyde and derivatives thereof and (2) methylol derivatives of acrylamide polymers.

10. A nitrocellulose latex composition according to claim 8 where the nitrocellulose particles contain, as a plasticizer, tributoxyethyl phosphate.

11. A nitrocellulose latex composition according to claim the nitrocellulose particles contain, as in plasticizer, dibutyl phthalate.

12. A nitrocellulose latex composition according to claim 8 wherein the nitrocellulose phase contains a nitrocellulose modifying hard resin.

13. A nitrocellulose latex composition according to claim 12 where the modifying resin is an alkyd resin selected from the class consisting of rosin-maleic anhydride-pentaerythritol esters and coconut oil modified non-drying alkyds.

References Cited
UNITED STATES PATENTS

| | | | |
|---|---|---|---|
| 3,360,487 | 12/1967 | Hondo et al. | 260—16 |
| 2,190,705 | 2/1940 | Dreyling et al. | 106—170 |
| 2,510,834 | 6/1950 | Phillips | 106—170 |
| 2,814,570 | 11/1957 | Sloan | 106—170 |
| 2,843,582 | 7/1958 | Voris | 106—170 |
| 3,198,645 | 8/1965 | Plunguian | 106—170 |
| 2,287,930 | 6/1942 | Canter | 260—15 |
| 2,729,571 | 1/1956 | Brandner et al. | 260—16 |
| 2,770,555 | 11/1956 | Cornwell | 260—15 |
| 2,937,153 | 5/1960 | Rasmussen et al. | 260—15 |
| 2,967,098 | 1/1961 | Weil | 149—49 |
| 3,272,640 | 9/1966 | Geurden | 260—16 |

WILLIAM H. SHORT, *Primary Examiner.*

E. M. WOODBERRY, *Assistant Examiner.*

U.S. Cl. X.R.

117—124, 132, 142, 148, 155, 161; 260—16

PO-1050
(5/69)

UNITED STATES PATENT OFFICE
CERTIFICATE OF CORRECTION

Patent No. 3,450,652          Dated June 17, 1969

Inventor(s)        Kuang Farn Lin

It is certified that error appears in the above-identified patent and that said Letters Patent are hereby corrected as shown below:

In the Claims, Column 6, line 32, insert " 8 where " between -- claim the --.

SIGNED AND
SEALED
SEP 30 1969

(SEAL)
Attest:

Edward M. Fletcher, Jr.
Attesting Officer

WILLIAM E. SCHUYLER, JR.
Commissioner of Patents